United States Patent
Pozzati

(10) Patent No.: US 9,976,663 B2
(45) Date of Patent: May 22, 2018

(54) INTELLIGENT PRESSURE RELIEF DEVICE FOR A DOUBLE ISOLATION VALVE

(71) Applicant: PetrolValves S.r.l., Milan (IT)

(72) Inventor: Roberto Pozzati, Busto Arsizio (IT)

(73) Assignee: PETROLVALVES S.P.A., Milan (IT)

( * ) Notice: Subject to any disclaimer, the term of this patent is extended or adjusted under 35 U.S.C. 154(b) by 0 days. days.

(21) Appl. No.: 15/365,939

(22) Filed: Nov. 30, 2016

(65) Prior Publication Data
US 2017/0234442 A1  Aug. 17, 2017

Related U.S. Application Data

(63) Continuation-in-part of application No. 14/731,404, filed on Jun. 4, 2015, now abandoned, which is a
(Continued)

(51) Int. Cl.
*F16K 17/18* (2006.01)
*F16K 31/122* (2006.01)
*F16K 17/04* (2006.01)

(52) U.S. Cl.
CPC .......... *F16K 17/18* (2013.01); *F16K 31/1225* (2013.01); *F16K 17/0473* (2013.01);
(Continued)

(58) Field of Classification Search
CPC .. F16K 17/044; F16K 17/0473; F16K 17/196; F16K 17/18; F16K 31/1225;
(Continued)

(56) References Cited

U.S. PATENT DOCUMENTS 2,071,969 A * 2/1937 Diescher ................. F16K 17/26
                                                    137/220
2,351,140 A * 6/1944 McCloy ................. F25B 41/046
                                                    137/493
(Continued)

FOREIGN PATENT DOCUMENTS

EP      1106880 A2    6/2001
WO   1998055784 A1   12/1998
WO   2009150495 A1   12/2009

OTHER PUBLICATIONS

International Search Report and Written Opinion dated Oct. 18, 2011 in connection with International Application No. PCT/EP2011/058637.
(Continued)

*Primary Examiner* — William McCalister
(74) *Attorney, Agent, or Firm* — Corridor Law Group, P.C.

(57) ABSTRACT

A pressure relief device for a double isolation valve comprises a body with a valve cavity. The valve body has a pocket formed therein. A disc is disposed in the central section of the pocket. The disc is interposed between two spring-actuated seats. Each of the seats is in fluid communication with opposing valve sides. The pocket central section is in fluid communication with the valve body cavity. Each of the seats is provided with two different types of gaskets in series. In operation, reverse pressure causes retraction of the seats, thereby relieving valve body cavity overpressure.

5 Claims, 3 Drawing Sheets

Related U.S. Application Data continuation of application No. 13/117,004, filed on May 26, 2011, now abandoned.

(60) Provisional application No. 61/348,692, filed on May 26, 2010.

(52) U.S. Cl.
CPC .... *Y10T 137/2663* (2015.04); *Y10T 137/2695* (2015.04); *Y10T 137/778* (2015.04)

(58) Field of Classification Search
CPC ......... Y10T 137/7778; Y10T 137/7779; Y10T 137/778; Y10T 137/86686; Y10T 137/87877; Y10T 137/2695; Y10T 137/2663
USPC ............ 137/493.1, 493.8, 493.9, 625.5, 883, 137/118.06, 119.09
See application file for complete search history.

(56) References Cited

U.S. PATENT DOCUMENTS

| | | | |
|---|---|---|---|
| 2,489,799 A | | 11/1949 | Minshall |
| 2,539,913 A * | 1/1951 | Koepcke | F16K 31/10 137/493 |
| 2,634,743 A * | 4/1953 | Audemar | F15B 7/003 137/112 |
| 2,765,181 A | 10/1956 | Butterfield | |
| 2,774,369 A * | 12/1956 | Di Tirro | F15B 20/001 137/102 |
| 2,955,613 A * | 10/1960 | Block | F16K 17/19 137/493.9 |
| 2,983,278 A * | 5/1961 | Heintz | F15B 13/0438 137/82 |
| 3,009,477 A * | 11/1961 | Bentley | F17D 1/086 137/565.11 |
| 3,023,782 A * | 3/1962 | Chaves, Jr. | F15B 13/0438 137/85 |
| 3,044,480 A * | 7/1962 | Lee | F15B 13/16 137/493.6 |
| 3,145,723 A | 8/1964 | Chorkey | |
| 3,203,447 A * | 8/1965 | Bremner | F16K 31/0627 137/595 |
| 3,339,579 A | 9/1967 | Lewis | |
| 3,348,563 A * | 10/1967 | Sidles, Jr. | F15B 13/022 137/100 |
| 3,437,065 A * | 4/1969 | Robbins, Jr. | B63G 8/26 114/125 |
| 3,454,028 A | 7/1969 | Baatrup | |
| 3,454,029 A * | 7/1969 | Fredd | F16K 17/0473 137/111 |
| 3,586,030 A * | 6/1971 | Nordin | F15B 7/10 137/109 |
| 3,633,606 A * | 1/1972 | Hay | F16K 11/065 137/113 |
| 3,734,132 A | 5/1973 | Kuhnelt | |
| 3,880,185 A * | 4/1975 | Harrison | B60T 11/101 137/112 |
| 4,003,397 A * | 1/1977 | Cooper | B01D 35/147 137/493.9 |
| 4,033,375 A * | 7/1977 | Hirsch | F16K 15/044 137/493.9 |
| 4,128,113 A * | 12/1978 | Hart | F16K 11/16 137/596.2 |
| 4,191,215 A * | 3/1980 | Gonner | F15B 11/0426 137/599.05 |
| 4,193,418 A * | 3/1980 | Meyer | F16K 17/0473 137/118.01 |
| 4,352,367 A * | 10/1982 | Pollman | F15C 3/14 137/316 |
| 4,439,984 A * | 4/1984 | Martin | B01D 35/147 137/493.9 |
| 4,463,775 A * | 8/1984 | Wittren | B62D 5/09 137/111 |
| 4,562,861 A * | 1/1986 | Payton | F16K 15/026 137/493.9 |
| 4,739,790 A * | 4/1988 | Clarke | B63C 11/18 128/205.24 |
| 4,759,261 A * | 7/1988 | Flieter | F04B 53/08 137/112 |
| 4,830,331 A * | 5/1989 | Vindum | F16K 1/126 137/883 |
| 4,967,794 A * | 11/1990 | Tsutsui | G05D 23/1393 137/597 |
| 5,144,982 A * | 9/1992 | Willbanks | H01F 7/1646 137/625.5 |
| 5,152,312 A * | 10/1992 | Kogel | F15B 13/022 137/118.03 |
| 5,454,698 A * | 10/1995 | Yokoi | F04B 7/02 137/625.18 |
| 7,159,605 B2 * | 1/2007 | Thrash, Jr. | F16K 3/265 137/112 |
| 7,318,448 B2 | 1/2008 | Fleischer et al. | |
| 2005/0028869 A1 | 2/2005 | Roth et al. | |
| 2010/0032036 A1 | 2/2010 | Quendt et al. | |

OTHER PUBLICATIONS

European Office Action dated Jan. 18, 2013 in connection with European Patent Application No. 11721539.2.
First Office Action dated Dec. 23, 2013 in connection with Chinese Patent Application No. 201180025893.X.
Canadian Office Action dated Apr. 30, 2014 in connection with Canadian Patent Application No. 2,800,110.
Patent Examination Report No. 1 dated Jul. 22, 2104 in connection with Australian Patent Application No. 2011257209.
Patent Examination Report No. 2 dated Oct. 9, 2014 in connection with Australian Patent Application No. 2011257209.
Patent Examination Report No. 3 dated Nov. 5, 2014 in connection with Australian Patent Application No. 2011257209.
Norwegian Office Action and Search Report dated Apr. 16, 2016 in connection with Norwegian Patent Application No. 20121393.

* cited by examiner

# INTELLIGENT PRESSURE RELIEF DEVICE FOR A DOUBLE ISOLATION VALVE

CROSS-REFERENCE TO RELATED APPLICATIONS

This application is a continuation in part of U.S. patent application Ser. No. 14/731,404 filed on Jun. 4, 2015, entitled "Intelligent Pressure Relief Device For A Double Isolation Valve". The '404 application is a continuation of U.S. patent application Ser. No. 13/117,004 filed on May 26, 2011, also entitled "Intelligent Pressure Relief Device For A Double Isolation Valve". The '004 application claimed priority benefits, in turn, from U.S. provisional patent application Ser. No. 61/348,692 filed on May 26, 2010, entitled "Intelligent Pressure Relief Valve". Each of the '004, '404 and '692 applications is hereby incorporated by reference herein in its entirety.

FIELD OF THE INVENTION

The present invention relates to pressure relief devices, and particularly to a device capable of providing upstream self-relieving of body cavity overpressure for double isolation valves.

BACKGROUND OF THE INVENTION

Isolation valves are designed to provide a double isolation barrier; typically, this is achieved either with double piston effect seats (ball or slab gate) valves or with double expanding gate valves. Both of these valve types are non-self-relieving. In fact, each seat is designed to provide a tight seal regardless of whether the pressure is acting from line-to-body or from body-to-line. This means that an eventual overpressure is retained in the body cavity by the specific seat design.

When double barrier isolation valves are exposed to thermal sources (such as, for example, radiation, proximity to hot equipment, and the like), the rise of valve body temperature can lead to an unacceptable increase in pressure.

The present pressure relief device maintains the valve body cavity pressure within acceptable limits.

An important issue in pressure relief device design is where the excess of pressure should be directed. Assuming that release to the atmosphere is not practicable, the aim is to convey the excess fluid from the cavity to the high pressure (HP) side of the valve. In fact, the low pressure side should be isolated by the shut-off valve, which when closed has the function of preventing fluid from entering the low pressure conduit.

In general, however, such isolation valves are bi-directional. In other words, either valve end can be the HP side when the valve is closed. What is needed, is a pressure relief device that can discern or "understand" which is the actual high pressure side and convey the body overpressure toward the HP side.

SUMMARY OF THE INVENTION

A pressure relief device comprises a body having a pocket formed therein, with a first, second, and third fluid communication formed therein. In some embodiments, the first and second fluid communication are connected to the pocket at opposite ends thereof and the third fluid communication is connected to the pocket at a central portion thereof In other or the same embodiments, the first fluid communication is between the pocket and a first valve end, the second fluid communication is between the pocket and a second valve end, and the third fluid communication is between the pocket and a body cavity within the valve.

In at least some embodiments, there is a spring mechanism within the pocket, allowing for fluid exchange between the first and third fluid communication when said spring mechanism is in a first set of positions.

In at least some embodiments, there is a spring mechanism within the pocket, allowing for fluid exchange between the second and third fluid communication when said spring mechanism is in a second set of positions.

In at least some embodiments, there is a spring mechanism within the pocket, allowing for no fluid exchange between any of the first, second, or third fluid communications when said spring mechanism is in a third set of positions.

In some embodiments, a pressure relief device for a double isolation valve comprises a body with a valve cavity. The device has a pocket formed therein. A disc is disposed in the central section of the pocket. In some embodiments, the disc is interposed between two spring-actuated seats. Each of the seats is in fluid communication with opposing valve sides of the valve body. The pocket central section is in fluid communication with the valve body cavity. Each of the seats is provided with two different types of gaskets in series.

In operation, reverse pressure causes retraction of the seats, thereby relieving valve body cavity overpressure. Reverse pressure is the pressure that exists where the valve body cavity connects to the pressure relief device. Reverse pressure occurs as a result of built-up overpressure in the valve body cavity. Built-up overpressure is generated when the pressure increases over the design value (for example due to temperature effects).

In a preferred pressure relief device, each of the seats is shouldered into the body. More preferably, the seats are shouldered into the body by metal-to-metal contact. The seats are preferably piston-effect type and positively energized by pressure directed toward the disc.

DETAILED DESCRIPTION OF ILLUSTRATIVE EMBODIMENT(S)

Figure 1A:
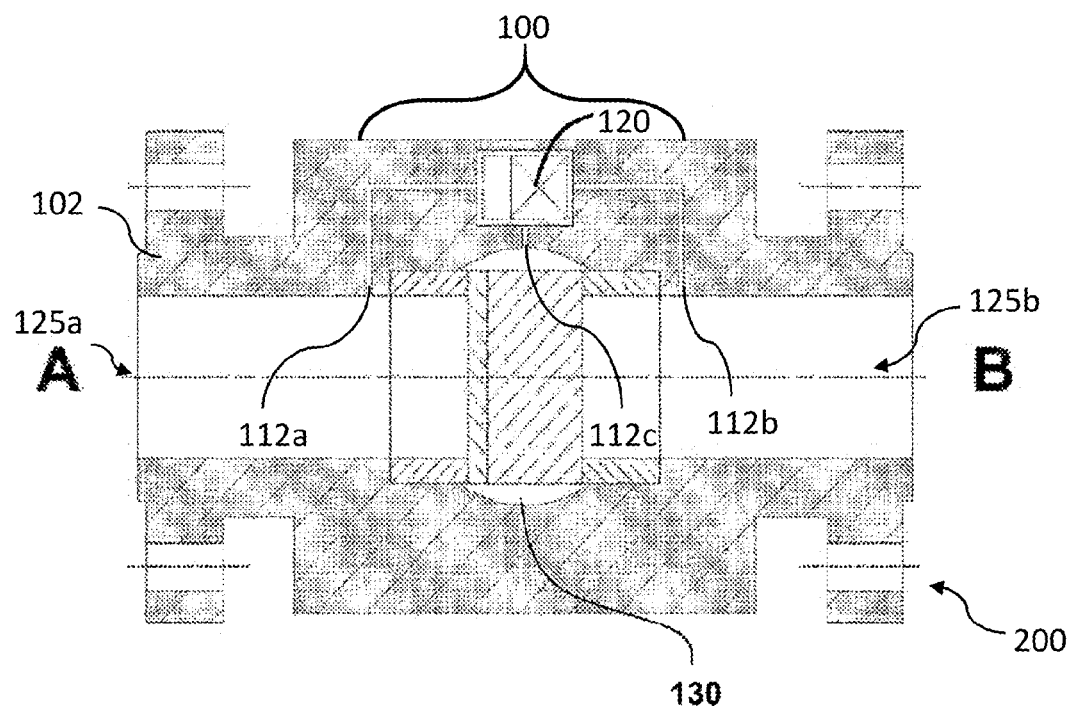
FIG. 1A is a side schematic view of a double isolation valve incorporating the present intelligent pressure relief device, in which an overpressure has developed at side A of the valve body.
Figure 1B:
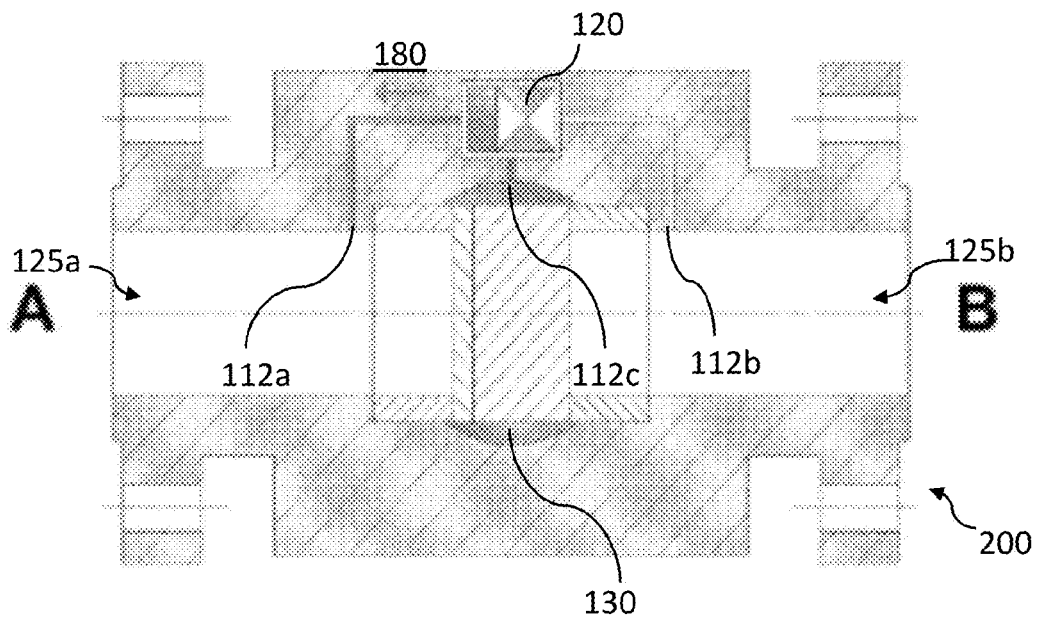
FIG. 1B is a side schematic view of the double isolation valve of FIG. 1A showing actuation of the present intelligent pressure relief device to relieve pressure in the direction of the arrow in FIG. 1B.

Turning first to FIG. 1A, a double isolation valve assembly 200 incorporating intelligent pressure relief device 100 is shown. Assembly 200 comprises valve body 102 having at least one valve body cavity 130. Assembly 200 can further comprise three fluid communications in the form of first transverse duct 112a, second transverse duct 112b, and third transverse duct 112c. Fluid communications are not limited to being straight ducts such as those shown. A fluid-tight path of communication can establish fluid exchange. In the embodiment shown in FIG. 1A, first transverse duct 112a and second transverse ducts 112b connect pocket 120 to first valve end 125a and second valve end 125b of a double isolation valve. Third transverse duct 112c connects pocket 120 to valve body cavity 130. These transverse ducts allow for fluid exchange between various components of assembly 200. As shown in FIG. 1B, actuation of the present pressure relief device relieves pressure in the direction of arrow 180 in FIG. 1B and directs the higher-pressure fluid stream back toward side B/valve end 125b of valve body 102.

Figure 2A:
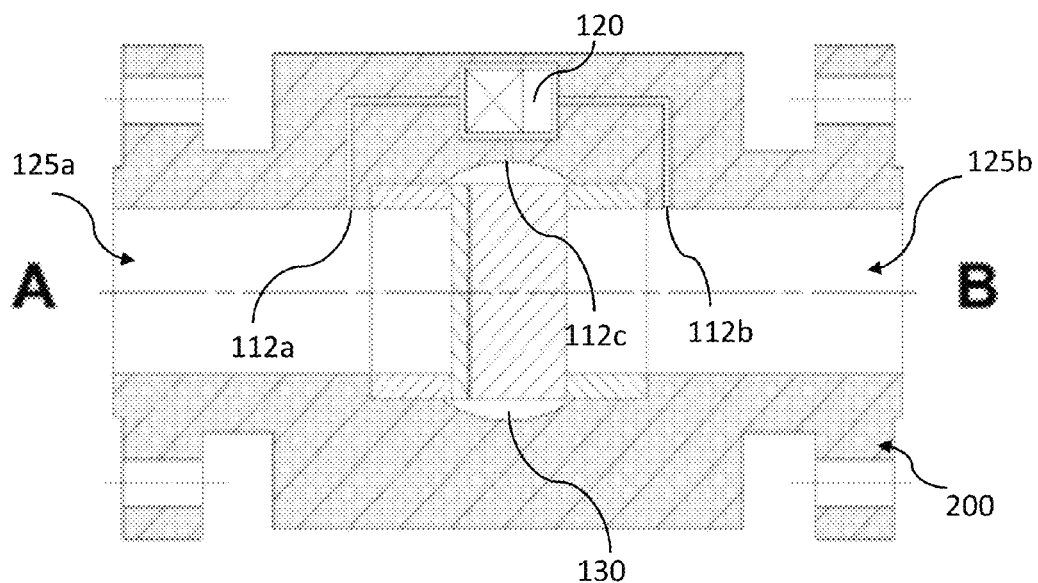
FIG. 2A is a side schematic view of a double isolation valve incorporating the present intelligent pressure relief device, in which an overpressure has developed at side B of the valve body.
Figure 2B:
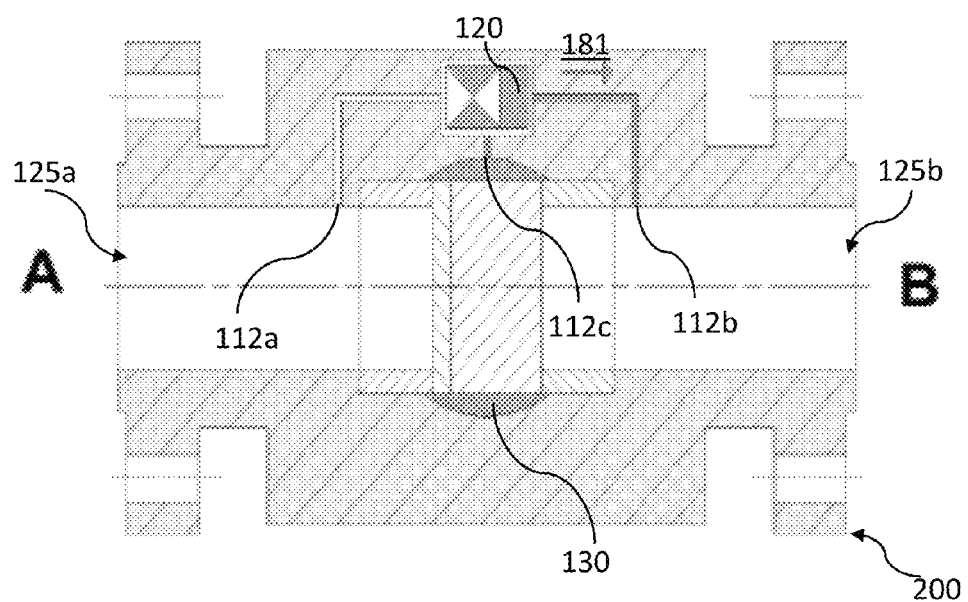
FIG. 2B is a side schematic view of the double isolation valve of FIG. 2A showing actuation of the present intelligent pressure relief device to relieve pressure in the direction of the arrow in FIG. 2B.

In FIG. 2A, the double isolation valve incorporating intelligent pressure relief device 100 has an overpressure developed at side B/valve end 125b of valve body 102. As shown in FIG. 2B, actuation of the present pressure relief device relieves pressure in the direction of the arrow 181 in FIG. 2B and directs the higher-pressure fluid stream back toward side B/valve end 125b of valve body 102.

Figure 3:
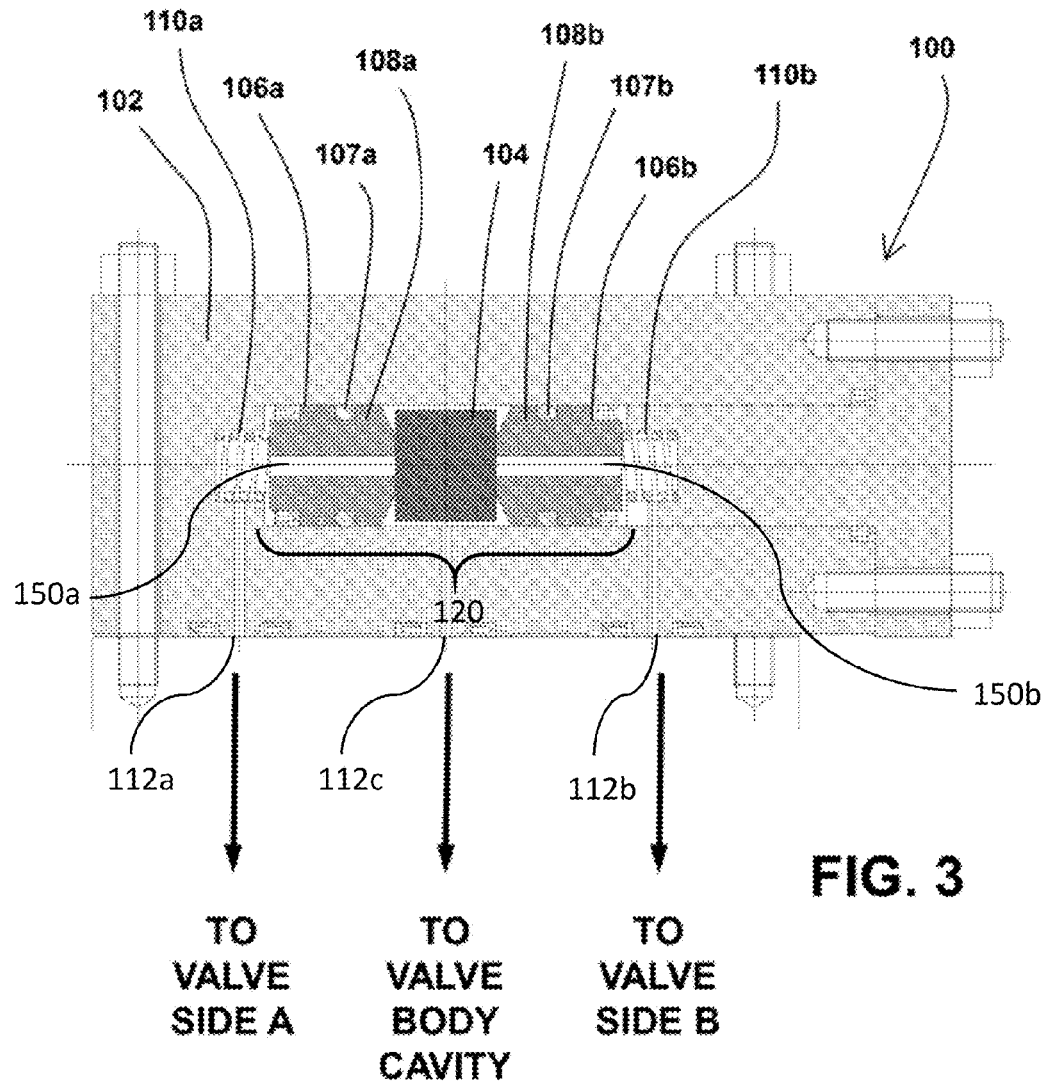
FIG. 3 is a side sectional view of an embodiment of the present intelligent pressure relief device showing its constituent components

FIG. 3 shows a side sectional view of an embodiment of intelligent pressure relief device 100 including a biasing mechanism. Pressure relief device 100 includes disc 104 reciprocally mounted in pocket 120 formed in valve body 102. Disc 104 is interposed between two spring actuated floating seats 108a, 108b. Seats 108a, 108b are actuated by springs 110a, 110b, respectively. This creates a spring mechanism within pocket 120, allowing for fluid exchange between the first and third fluid communication when said spring mechanism in a first set of positions. This occurs when the pressure in the first fluid communication is greater than the pressure in the second fluid communication.

The spring mechanism within pocket 120 also allows for fluid exchange between the second and third fluid communication when said spring mechanism in a second set of positions. This occurs when the pressure in the second fluid communication is greater than the pressure in the first fluid communication.

The spring mechanism within pocket 120 also allows for no fluid exchange between any of the first, second, or third fluid communications when said spring mechanism is in a third set of positions. This occurs when the first and second fluid communications have pressures within a specified tolerance of equilibrium. Minor deviations from equilibrium pressure beneath this tolerance will result in only partial actuation of the spring biasing mechanism, and the fluid exchange between the valve body cavity and the high-pressure side of the valve is disabled under these circumstances. In some embodiments, this tolerance is set by the mechanical properties of the spring(s) contained within the spring biasing mechanism FIG. 3 further shows through-channels 150a and 150b of floating seats 108a and 108b respectively. In some embodiments, through channels 150a and 150b are located on the central axis of seats 108a and 108b respectively. Spring actuated floating seats 108(a-b) can contact disk 104 at opposite ends.

In some embodiments when an isolation valve is closed, fluid can become trapped within valve body cavity 130. Reverse pressure occurs as a result of built-up overpressure in valve body cavity 130. Built-up overpressure is generated when the pressure increases over the design value (for example due to temperature effects). Intelligent pressure relief device 100 vents this overpressure in valve body cavity 130 to the higher-pressure end of the valve. As shown in FIG. 1B, actuation of the present pressure relief device relieves pressure in the direction of the arrow in FIG. 1B and directs the higher pressure fluid stream back toward valve end 125a of the valve body.

Each of seats 108a, 108b is in direct connection with the respective valve end, as shown by the arrows depicting the flow of fluid to valve end 125a and valve end 125b of valve body 102 shown and described previously with respect to FIGS. 1A, 1B, 2A and 2B. The central section of pressure relief device 100, where disc 104 is located, is in fluid communication with valve body cavity 130, as shown by the arrows 180 and 181 depicting the flow of fluid to valve body cavity 130, depending on the pressure in the fluid communications.

As further shown in FIG. 3, each of seats 108a, 108b can be provided with gaskets, two of which are shown as gaskets 106a, 106b. In at least some embodiments, these gaskets form a tight seal between seats 108(a-b) and valve body 102. Each of seats 108a, 108b is preferably further provided with a second set of gaskets 107a, 107b, such that seats 108a, 108b are provided with two different types of gaskets in series, as shown in the embodiment depicted in FIG. 3, in which the two gaskets are interposed between each of seats 108a, 108b and pocket 120 formed in pressure relief device 100. The back of each seat 108a, 108b is shouldered, preferably by metal-to-metal contact, into pocket 120.

Seats 108a, 108b can be piston-effect type components that are positively energized by pressure exerted toward disc 104. Reverse pressure causes retraction of seats 108a, 108b, thereby allowing relief of overpressure developed in the main cavity of valve body 102. (See FIGS. 1B and 2B, in which overpressure is relieved in the direction of the arrows and the higher pressure fluid stream is directed back toward the side of valve body 102 exerting the overpressure).

In some embodiments, pressure relief device 100 works when pressure in first transverse duct 112a and/or second transverse duct 112b causes disc 104 and seats 108a-b to be biased against the valve side with lower pressure. In these situations, pressure in valve body cavity 130 can enter pocket 120. If the pressure in valve body cavity 120 is higher than the pressure on the higher pressure side of valve, then the seat 108a-b associated with the higher pressure side of the valve is pushed back, establishing fluid communication directly between valve body cavity 130 and the higher pressure side of the valve, through pocket 120, and relevant selection of transverse ducts, until a state of pressure equilibrium has been achieved within a pre-specified tolerance. In some embodiments, this tolerance is set by the mechanical properties of the spring(s) contained within the spring biasing mechanism. Then, the biasing mechanism such as spring 110a-b closes the gap between disc 104 and seat 108a-b.

The present intelligent pressure relief device has the following distinguishing features and benefits:
(a) Valve body cavity pressure that exceeds the value of HP side pressure is relieved into the HP side itself This is achieved regardless of which is the actual HP side when the valve is closed.
(b) The present intelligent pressure relief device has substantially no impact or influence on the following valve performance characteristics:
(1) sealing capability;
(2) bi-directional behavior;
(3) double block and bleed capability.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A pressure relief device for a double isolation valve comprising;
   (a) a body comprising
   (i) a pocket;
   (ii) a first transverse duct connected to said pocket at a first end of said pocket;
   (iii) a second transverse duct connected to said pocket at a second end of said pocket, wherein said second end is opposite of said first end; and
   (iv) a third transverse duct connected to the pocket at a central portion of said pocket
   wherein said first and second transverse ducts are configured to allow fluid communication of said pocket with a first valve end and a second valve end of a double isolation valve respectively, and said third transverse duct is configured to allow fluid communication of said pocket with a valve cavity of a double isolation valve;
   (b) a first spring-actuated seat arranged within said pocket having a through-channel stretching out axially between opposite ends of said first spring-actuated seat, and wherein said first spring-actuated seat has gaskets contacting peripheral walls of said pocket in a tight manner;
   (c) a second spring-actuated seat arranged within said pocket having a through-channel stretching out axially between opposite ends of said second spring-actuated seat, and wherein said second spring-actuated seat has gaskets contacting peripheral walls of said pocket in a tight manner;
   (d) a disc disposed between said first and said second spring-actuated seats, said first and said second spring-actuated seats contacting said disc at opposite ends thereof such that said first and second spring-actuated seats seal the volume of said pocket surrounding said disc,
   wherein said disc and said first and said second spring-actuated seats are movable along said pocket biased by a pressure differential between said first valve end and said second valve end, and wherein overpressure in said valve cavity causes retraction of said spring-actuated seat arranged in the pocket side fluidly communicating with the valve end where the pressure is higher, thereby relieving valve body cavity overpressure.

2. The pressure relief device of claim 1, wherein each of said seats is shouldered into said body.

3. The pressure relief device of claim 2, wherein said seats are shouldered into said body by metal-to-metal contact.

4. The pressure relief device of claim 1, wherein said seats are piston-effect type and positively energized by pressure directed toward said disc.

5. A double isolation valve comprising said pressure relief device according to claim 1.

* * * * *